(12) United States Patent
Gwynn

(10) Patent No.: US 6,259,429 B1
(45) Date of Patent: Jul. 10, 2001

(54) MULTI-CHANNEL VISUAL DISPLAY APPARATUS

(75) Inventor: Eric Charles Eykyn Gwynn, Hove (GB)

(73) Assignee: SEOS Displays Limited, West Essex (GB)

(*) Notice: Subject to any disclaimer, the term of this patent is extended or adjusted under 35 U.S.C. 154(b) by 0 days.

(21) Appl. No.: 09/100,181

(22) Filed: Jun. 18, 1998

(30) Foreign Application Priority Data

Jun. 23, 1997 (GB) .................................................. 9713227

(51) Int. Cl.[7] .................................................. G09G 5/02
(52) U.S. Cl. .................................................. 345/150; 345/4
(58) Field of Search .................................. 345/1–6, 150, 345/151, 153, 154, 302, 427

(56) References Cited

U.S. PATENT DOCUMENTS

| | | | |
|---|---|---|---|
| 5,020,116 | * | 5/1991 | Macaulay . |
| 5,396,257 | * | 3/1995 | Someya et al. ........................... 345/1 |
| 5,440,352 | * | 8/1995 | Deter et al. ........................... 348/750 |
| 5,668,569 | * | 9/1997 | Greene et al. ........................ 345/103 |
| 5,805,117 | * | 9/1998 | Mazurek et al. .......................... 345/1 |
| 6,020,868 | * | 2/2000 | Greene et al. ........................... 345/88 |

* cited by examiner

Primary Examiner—Almisa R. Jankus
Assistant Examiner—Henry N. Tran
(74) Attorney, Agent, or Firm—Iandiorio & Teska

(57) ABSTRACT

Multi-channel visual display apparatus comprising electronic means which is such that adjacent visual displays in a multi-channel display configuration are matched in color and hue in 2- and 3-primary color systems (FIG. 3). The apparatus may include one or more of a liquid crystal display projector (20), a cathode ray tube projector (10), and a light valve projector. A camera (30) and a front projection screen 40 are employed.

9 Claims, 5 Drawing Sheets

COLOUR MATCHING IN MULTICHANNEL VISUAL DISPLAYS

COLOUR MATCHING IN MULTICHANNEL VISUAL DISPLAYS

COLOUR MATCHING IN MULTICHANNEL VISUAL DISPLAYS

COLOUR MATCHING IN MULTICHANNEL VISUAL DISPLAYS

MULTI-CHANNEL VISUAL DISPLAY APPARATUS

This invention relates to multi-channel visual display apparatus.

Multi-channel visual display apparatus is known. Such apparatus is used in simulators/trainers for aircraft flight, ship's bridge, vehicle driving, large and small bore weapons, and in entertainment/information/advertising such for example as video walls.

The known multi-channel visual display apparatus utilises raster or calligraphic scan techniques. The apparatus is viewed by one or more observers and it is such that each individual display channel covers a designated field of view in relation to each display and an observer's viewing position. The displayed field of view for each individual display channel is arranged so that together the display channels provide the appearance of one continuous display which is free from discontinuities in picture geometry, brightness or colour at the boundaries.

The presentation of displayed field of view data can be provided by a graphics computer or a television source. The observer or observers view the multi-channel display as a projection on a front or rear projection screen, or directly on the face of a monitor. Alternatively, viewing is effected from projectors or TV monitors, through optical collimating devices such as collimating mirrors and/or lenses.

In multi-channel visual display apparatus, it is desirable to create an effect in which the data from the various channels are optically, mechanically and electronically aligned and adjusted so as to create the effect of a continuous signal display without noticeable geometric, brightness or colour mis-matches at the common boundaries between individual displays. These boundaries can either be butt joined or blended into each other over a few degrees of field of view overlap, or leave a small gap. In order to assist in geometric, brightness and colour matching, known apparatus employs micro computer technology incorporated in a remote control unit, whereby a maintenance engineer can remotely adjust each channel whilst observing the display.

When addressing the problem of matching adjacent display channels in terms of their colour chromaticity, current known practice is to ensure that the cathode ray tubes in adjacent displays are from the same manufacturer and are of the same type number. If monitors and projectors of different types and designs are used, for example liquid crystal display projectors and 3-cathode ray tube projectors, then current known practice is for their phosphor type numbers/colour filters to be the same. This is not always possible without incurring major design changes to the equipment. Other methods which are currently used are optical correction filters and, if liquid cooling or coupling is employed between cathode ray tube and lens, to add colour correction dyes to the liquid.

WO 92/08319 describes multi-channel display apparatus with a separate brightness adjustment control for each primary colour of each display channel. A primary colour is displayed in adjacent display channels with the same drive signal and the appropriate channel brightness adjustment controls are adjusted to minimise the brightness difference between the adjacent channels. This is then repeated for the other primary colour or colours. This procedure will enable a reasonable brightness match to be obtained between adjacent channels of a multi-channel display, but will not provide colour continuity across the boundary between adjacent channels unless the adjacent channel primary colours are inherently well matched.

An aim of the present invention is to provide multi-channel visual display apparatus having electronic means for compensating and correcting for colour mis-matching between adjacent channels.

Accordingly, in one non-limiting embodiment of the present invention there is provided multi-channel visual display apparatus comprising electronic means which is such that adjacent visual displays in a multi-channel display configuration are matched in colour in 2-and 3-primary colour systems.

The apparatus of the invention may be one in which the electronic means utilises additive mixing of red, green and blue video signals within each channel in order to achieve the matching. Alternatively, the apparatus may be one in which the electronic means utilises subtractive mixing of red, green and blue video signals in order to achieve the matching.

The apparatus of the invention may be one in which mixing of colour drive signals is in the form:

$$R_{Drive} = R_{IN} + S.G_{IN} + T.B_{IN}$$

$$G_{Drive} = U.R_{IN} + G_{IN} + V.B_{IN}$$

$$B_{Drive} = W.R_{IN} + X.G_{IN} + B_{IN}$$

where S, T, U, V, W and X are constants.

The apparatus of the invention may alternatively be one in which mixing of colour drive signals is in the form:

$$R_{Drive} = R_{IN} + S.G_{IN} + T.B_{IN}$$

$$G_{Drive} = U.R_{IN} + G_{IN} + V.B_{IN}$$

$$B_{Drive} = W.R_{IN} + X.G_{IN} + B_{IN}$$

where S, T, U, V, W and X are variables.

The variables may be a function of the position within a channel picture. The variables may be a function of horizontal and/or vertical scan timing. The variables may be controlled by a television camera viewing display channels. The variables may alternatively be controlled by a 3-primary colour sensor viewing display channels.

The apparatus of the invention may utilise raster scan formats and calligraphic scan formats.

The apparatus of the invention may be used with two or more projectors including liquid crystal display projectors, cathode ray tube projectors and light valve projectors.

The apparatus may utilise real image displays and collimated displays.

The apparatus of the invention may include television or graphics monitors.

The apparatus of the invention may include sensing means for sensing required correction values for the additive mixing or the subtractive mixing, the sensing means utilizing a 3-colour television camera or a 3-colour sensor, or other sensor providing colour information.

The apparatus of the invention may include tracking and adjustment means for tracking and adjusting the sensing of the required correction values in accordance with horizontal and vertical timing scan signals.

The apparatus of the invention may be applied to 2-colour projector and television/graphics monitor displays.

The apparatus of the invention may be such that the colour mis-matching in an edge-butted or blended multi-channel display is addressed by pre-selection of cathode ray tubes or by optical correction means.

The colour matching between adjacent displays may be achieved by electronic means by cross-mixing predetermined percentages of video signals of the three primary colours of red, green and blue within a channel in such a way as to reposition any or all three corners in that display's colour triangle's corners to new x-y coordinates to coincide or at least move closer to the corners of any adjacent channel's colour triangle.

To achieve the shift of either one or all of the red, green and blue corners in the colour triangle of a particular channel's display, each primary colour's input signal has specific percentages of the other input signals added to it, according to the equations below.

$$R_{out} = R_{in} + p_{rg} \cdot G_{in} + p_{rb} \cdot B_{in}$$
$$G_{out} = p_{gr} \cdot R_{in} + G_{in} + p_{gb} \cdot B_{in}$$
$$B_{out} = p_{br} \cdot R_{in} + p_{bg} \cdot G_{in} + B_{in}$$

where $p_{rg} \ldots p_{bg}$ are the colour mixing percentages, which may be constants or vary with position in the channel, and $R_{out}$ etc are the corrected drive signals to the channel's display device (CRT/LCD etc).

This cross-mixing of primary colours can be employed in all channels as required to achieve best colour match. It will be appreciated that in order to maintain colour match over a range of luminance levels, the mixing should be done at a point in the signal chain where the signal is linear with brightness, otherwise the mixing percentages should be gamma corrected in the same way as the signals.

The above described technique can be employed in display devices employing only two primary colours, examples of such display devices being beam penetration monitors and 2-cathode ray tube projectors.

In a multi-channel display system of two or more channels, the adjustment of the percentage of colour to be summed can, in a basic technique, be resolved by manual adjustment of the summing resistors feeding into a summing amplifier, wherein the resistors are variable resistors and their settings, which determine percentage of colour to be summed, are determined by subjective evaluation of the display by an operator, or by use of a spectral photometer, to determine the best adjustment for a match in hue between adjacent channels.

In an alternative arrangement and especially for systems of three or more display channels which may require the percentage of the correction signals to vary as a function of horizontal and vertical scan timing, an automatic system may be employed that utilises a red/green/blue colour television camera or red/green/blue colour detectors. Using this camera or three colour sensor and the present display's scan and video equipment and RCU, with modifications, the apparatus of the present invention may be employed to detect and correct for hue differences between adjacent channels in relationship to each channel's horizontal and vertical timing scan frequencies, whether raster or calligraphic systems.

It is to be appreciated that in describing the present invention, only the electronic summing technique and the colour triangles' shift in response to changes brought about by the action of the electronic summing technique are discussed. The structure of the display systems, whether real image or collimated display, and the mechanical elements as well as the digital image generator system and the RCU's capabilities in terms of video signal generator, brightness control, gamma control, scan timing, geometry predistortion and other parameters presently controlled by the digital image generator and RCU, are not discussed in detail.

Embodiments of the invention will now be described solely by way of example and with reference to the accompanying drawings in which.

Figure 1:
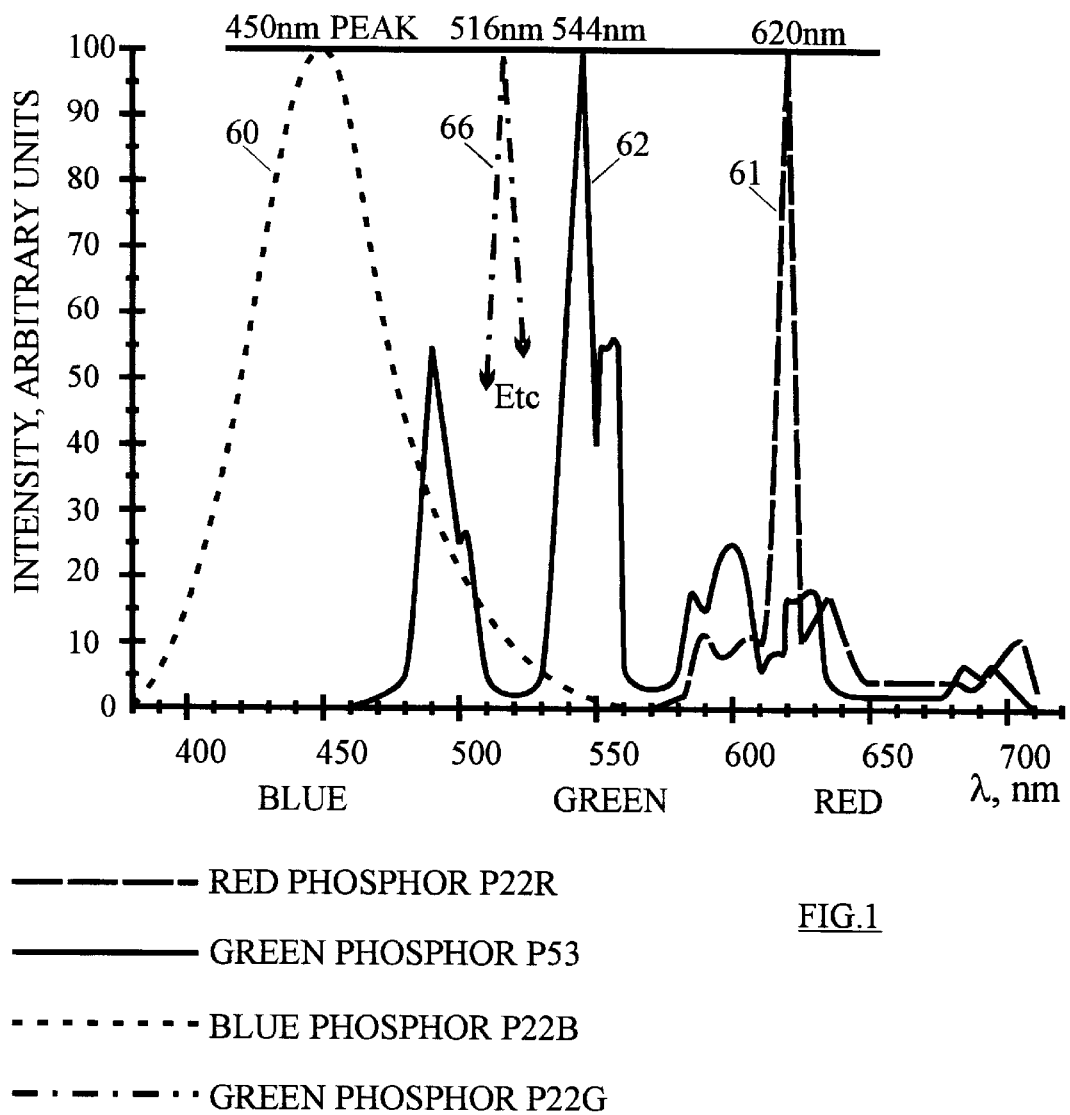
FIG. 1 shows the spectral output sensitivities of four different phosphors, with the Y axis being in arbitrary units.

Referring to the drawings, FIG. 1 shows the spectral output sensitivities for four common phosphor types, with the x-axis shown over the visible spectrum for wavelengths in nanometers, while the Y-axis gives intensity in arbitrary units.

A blue phosphor 60 is shown of type P22B with a peak wavelength of 450 nm and CIE coordinates of x=0.146 and y=0.052. A red phosphor 61 is shown of type P22R with a peak wavelength of 620 nm and CIE coordinates of x=0.674 and y=0.326. A green phosphor 62 is shown of type P53 with a peak wavelength of 544 nm and CIE coordinates of x=0.368 and y=0.539. Another green phosphor 66 is shown of type P22G of peak wavelength 516 nm and CIE coordinates of x=0.218 and y=0.712.

Figure 2:
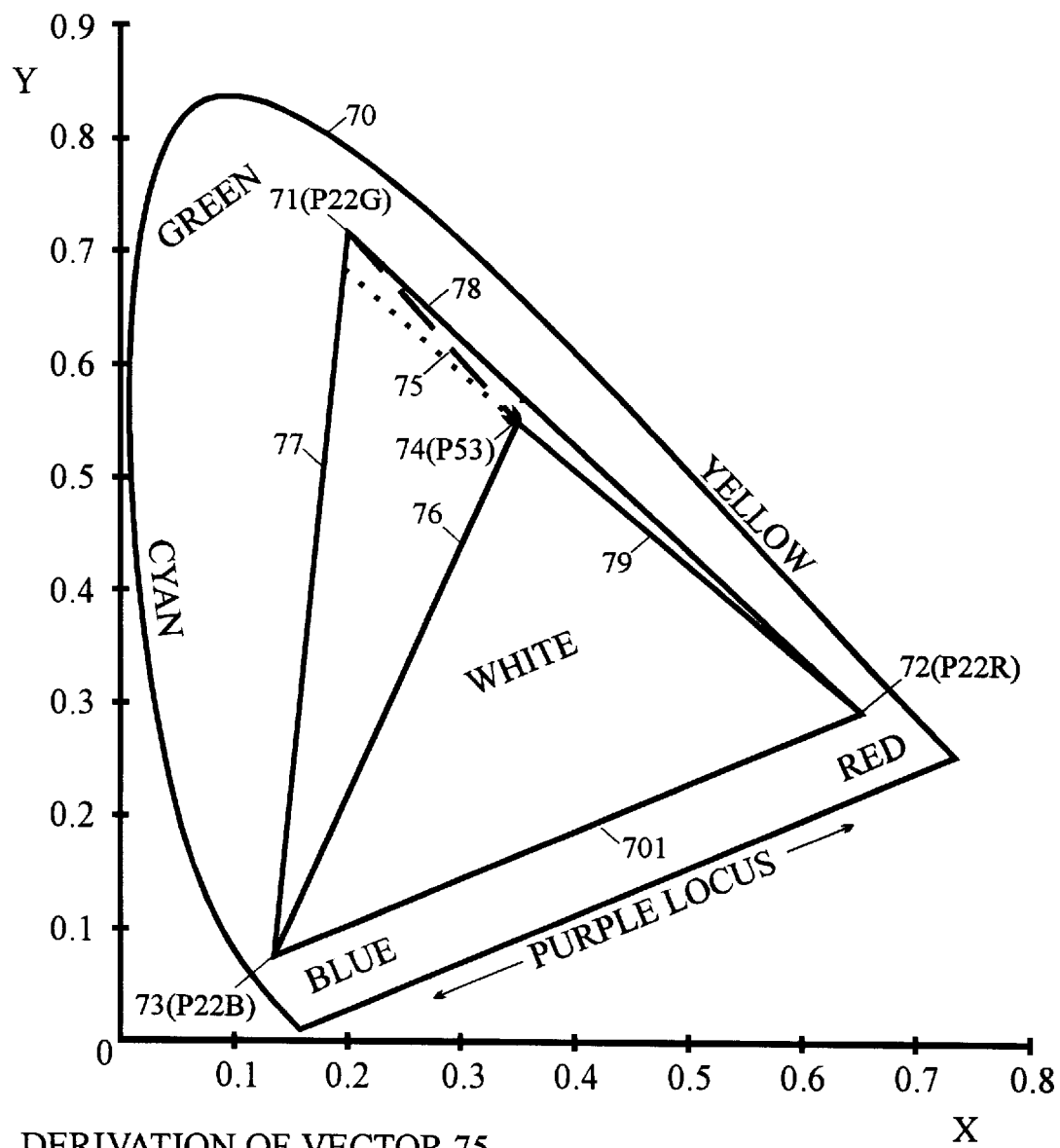
FIG. 2 is a representation of a CIE (Commission International de l'Eclairage) chromaticity diagram with the addition of two examples of red, green and blue colour triangles relating to two projectors.
Figure 2:
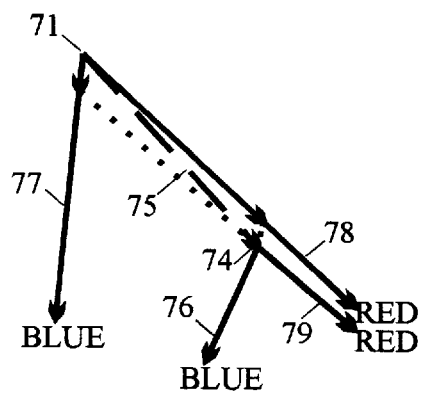

Referring now to FIG. 2, there is shown a representation of the CIE chromaticity diagram 70, with x and y axis showing the CIE co-ordinate's scales. The CIE x/y positions of the four phosphors in FIG. 1 are shown in FIG. 2. The phosphor 60 is shown at point 73. The phosphor 61 is shown at point 72. The phosphor 62 is shown at point 74. The phosphor 66 is shown at point 71. Consider two television projectors in a 2-channel display. One 3-colour projector employs cathode ray tubes with a red filter type 61, a green filter type 62 and a blue filter type 60. The other 3-colour projector employs a 3-colour liquid crystal display with a red phosphor type 61, a green phosphor type 66 and a blue phosphor type 60. The two projectors' colour triangles are shown in FIG. 2 where the triangle 76, 79, 701 is the colour triangle for the first cathode ray tube projector. The triangle 77, 78, 701 is the colour triangle for the second liquid crystal display projector. It can be seen that the liquid crystal display projector produces a more saturated green than the cathode ray tube projector. When viewing the two displays butted together, the gamut of colours around green will be mis-matched although a good match occurs along the purple locus 701.

By employing the techniques of the present invention, the point 71 will be moved closer to the point 74 along the vector 75 by summing a predetermined percentage of the green video signal from the second projector into the red video circuit of the second projector, and another predetermined percentage of the green video signal of the second projector into the blue video circuit of the second projector.

It should be noted that the two colour triangles are based on the specification of particular manufacturers. In practice, a phosphor/filter's CIE x/y co-ordinates can vary between different manufacturers or even different batch runs from the same manufacturer. This would mean that even if two projectors were to incorporate the same phosphor/filter types, the technique of the present invention may still need to be incorporated. Other optical components may also introduce colour differences that need correcting.

Figure 3:
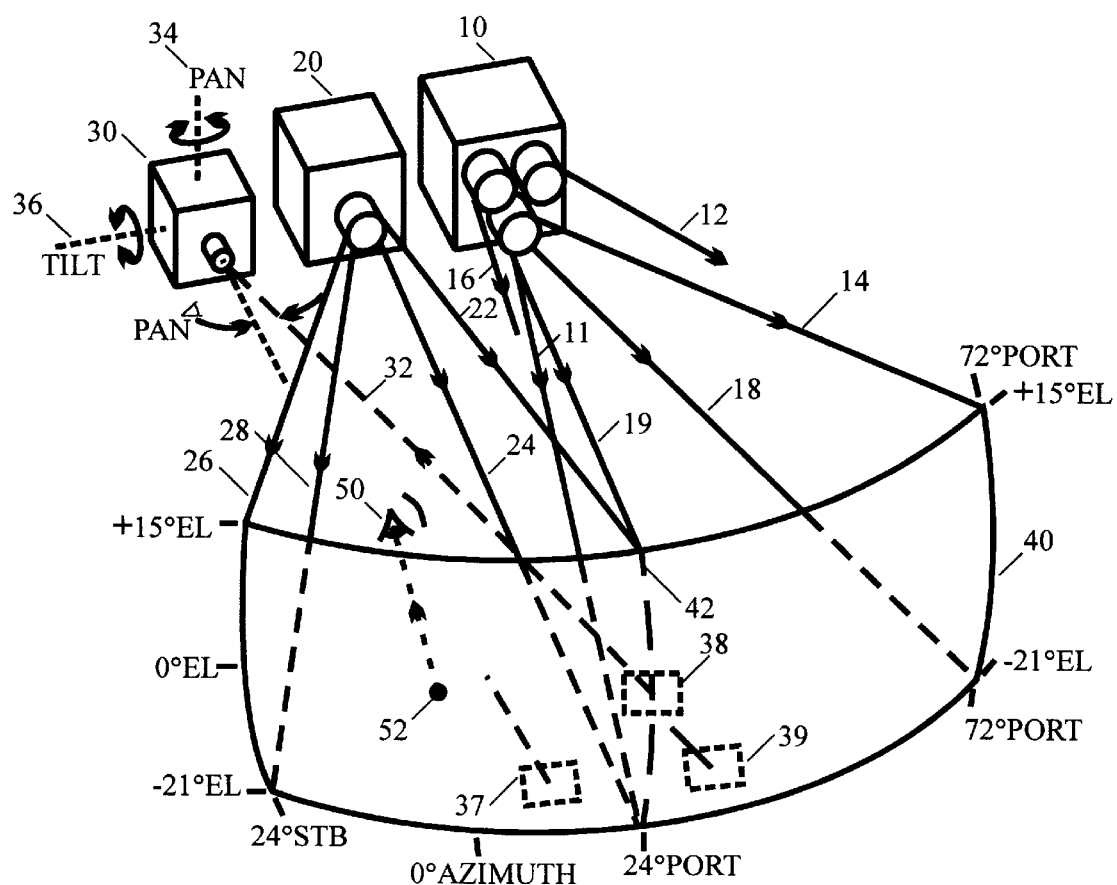
FIG. 3 is an isometric view of a preferred 2-channel real image display apparatus of the invention, employing two television projectors of different types with the addition of a three colour television camera with red/green/blue video outputs, mounted on a pan and tilt platform.

Referring to FIG. 3, there is shown a first projector 10 which may be, for example, a 3-lens, 3-cathode ray tube projector. The first projector 10 is directed at a front projection screen 40 on to whose surface a real image is produced via the projection rays 11, 12, 14, 16, 18, 19. For clarity, only two rays are shown from the two upper lenses. The image produced on the screen from the projector 10, when referred to eyepoint 50, covers the area +15° elevation to −21° elevation and 72° port to 24° port in the field of view.

A second projector 20 is shown which may be, for example, a single lens liquid crystal display projector. The second projector 20 is directed at the screen 40 on to which a real image is produced via the projection rays 22, 24, 26, 28. The image produced on the screen from the projector 20, when referred to the eyepoint 50, covers the area +15° elevation to −21° elevation and 24° port to 24° starboard in the field of view with the point 52 being to 0° elevation, 0° azimuth from the eyepoint 50.

A red/green/blue television camera 30 or a 3 primary colour detector camera 30 having movement in pan 34 and tilt 36 axes can be moved across the screen at various pointing angles 32, for example to view an area 37, or 38 or 39 of the displayed image.

A broken line 42 shows the boundary between the two projected images. At this boundary, the two images are adjusted in geometry, red/green/blue colour, and brightness in order to achieve a substantially continuous display. The join 42 between the images is either butted or overlapped, and in the latter case, images are blended into each other, providing that the green, red and blue colours of the outputs of the two projectors are matched.

A 3-colour television camera 30 of separate red/green/blue video outputs (or alternatively a 3-primary colour sensor) is mounted on a pan 34 and tilt 36 table which allows the television camera 30 to traverse the total field of view of the display and measure the red, green and blue chromatic outputs of each channel's display in turn for comparison of these outputs between adjacent displays. Any differences in chromatic output are corrected through the RCU of the system and the video and scanning electronic units.

By way of example, and specifically in the case of additive cross-mixing, to check the differences in the green outputs of projectors 10 and 20, their respective red and blue video outputs may be set to black levels, and the green outputs of both channels may be set to output equal brightness. The camera 30 of viewing area 37, 38 or 39 will then be aligned to cover the two displayed fields of view of the two channels, either in turn at 37 and 39, or simultaneously at 38 as shown in FIG. 3. Both displays are sensed at each side of the scene join at 42. The red and blue video outputs of the television camera 30 for both displays can then be compared with each other. By application of the present invention, appropriate percentages of green video signal can be summed into the red and blue video circuit channels until a matching of the green is achieved in both displays.

Figure 4A:
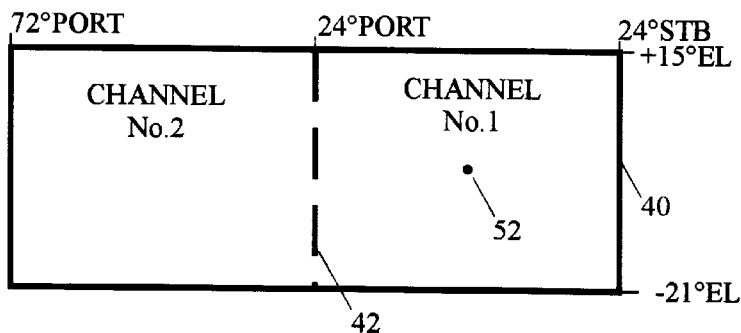
FIGS. 4a, 4b and 4c show three different multi-channel image display configurations showing their butted or blended edges.
Figure 4B:
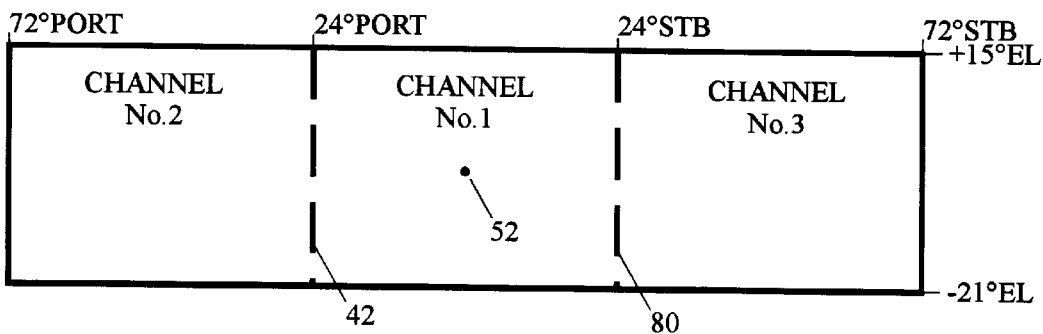
Figure 4C:
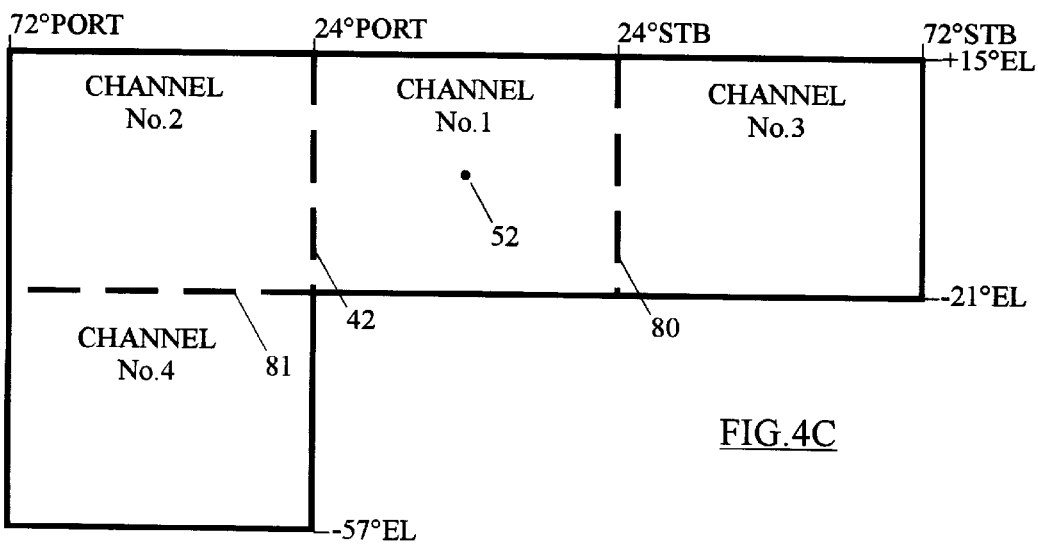

Referring to FIG. 4, there are shown three multi-channel configurations. More specifically, FIG. 4a shows a 2-channel display as represented in FIG. 3 with a channel-to-channel join at 42. FIG. 4b shows a 3-channel display with two channel-to-channel joins at 42 and 80. FIG. 4c shows a 4-channel display with three channel-to-channel joins at 42, 80 and 81.

In all cases, the 0° elevation/0° azimuth line of sight of FIG. 3 is shown at 52.

In FIG. 4a, with the present invention, the channel 1 display can be adjusted if required to match channel 2 or vice versa.

In FIGS. 4b and 4c however, where the channel 1 display shares edges with channels 2 and 3, another case arises as follows. Assume none of the channels match each other in colour. If channel 1 is adjusted by the present invention to match channel 2 at 42, then its match with channel 3 at 80 may be made worse. In this situation, the edges of channel 1 at 42 and 80 will be adjusted in colour for match to channels 2 and 3 respectively. In the same way that shading correction may be applied to brightness and colour across each channel, it may also be applied to the colour mixing percentages. Thus the colour gamut of channel 1 may vary across its width in order to match the possibly different gamuts of channels 2 and 3. This is acceptable because gradual change of colour across a channel is less obvious than a sudden change at a boundary. Alternatively, the two larger gamuts may both be reduced to match the channel with the smallest gamut.

In the same way, the join at 81 between the channel 2 and channel 4 displays will be controlled by the vertical scan signal.

Figure 5:
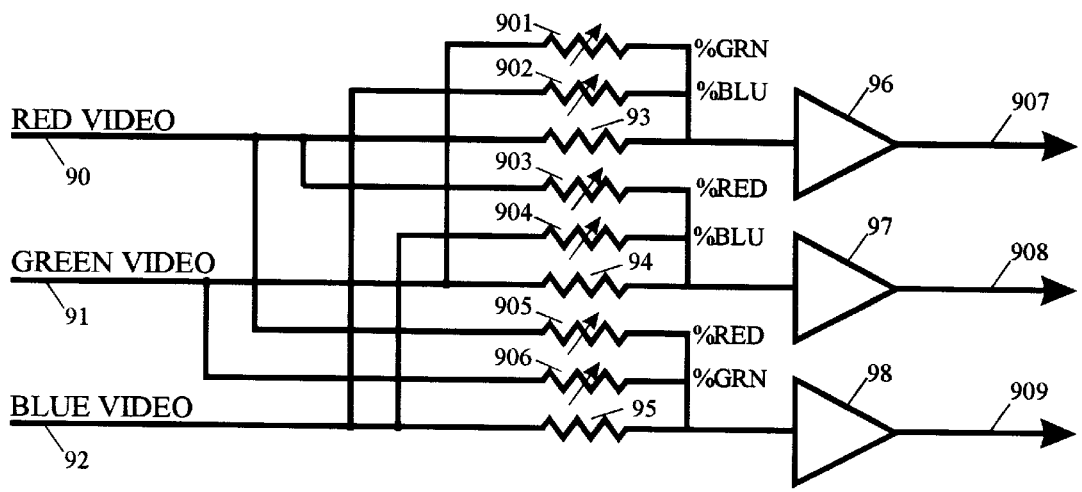
FIG. 5 is a circuit diagram showing one form of the invention that employs manual adjustment devices.

Referring to FIG. 5, there is shown a circuit diagram incorporating one form of the invention that employs manual adjustment, that is variable resistors. The manual adjustment enables pre-determined percentages of the red, green and blue video signals originating from the digital image generator to be cross-mixed in each channel before being displayed at the projector's red, green and blue cathode ray tubes or red/green/blue liquid crystal display plate. For example, if the red, green and blue video signals 90, 91 and 92 respectively are well matched in hue, then summing resistors 901, 902, 903, 904, 905 and 906 will be set to 0%. Then the red video 90 will feed unmodified through 93 and summing amplifier 96 to 907.

In the same way, the green video at 91 would pass unmodified through 94 and 97 to 908. The blue video at 92 would pass unmodified through 95 and 98 to 909.

By way of example and referring to FIG. 2 and its two colour triangles 77, 78, 701 and 76, 79, 701 in a 2-projector, 2-channel display, point 71, the green corner in the second projector 20 is more saturated than 74, the green corner of the first projector 10 whilst the two blue and red corners are well matched. Thus, in FIG. 5, the variable resistor 901 must be adjusted to feed the required percent of green into the red summing amplifier 96, and the variable resistor 906 must be adjusted to feed the required percentage of green video into the blue summing amplifier 98 in order to effectively shift 71 along vector 75 to point 74. In this particular example, all other variable resistor values must of course be set to 0%.

The circuit diagram of FIG. 5 meets the requirements of 2-channel display systems. It cannot however solve the problem in multi-channel displays of three or more channels when the video signal percentage value of cross-mixing may need to change as a function of position within the channel picture.

Figure 6:
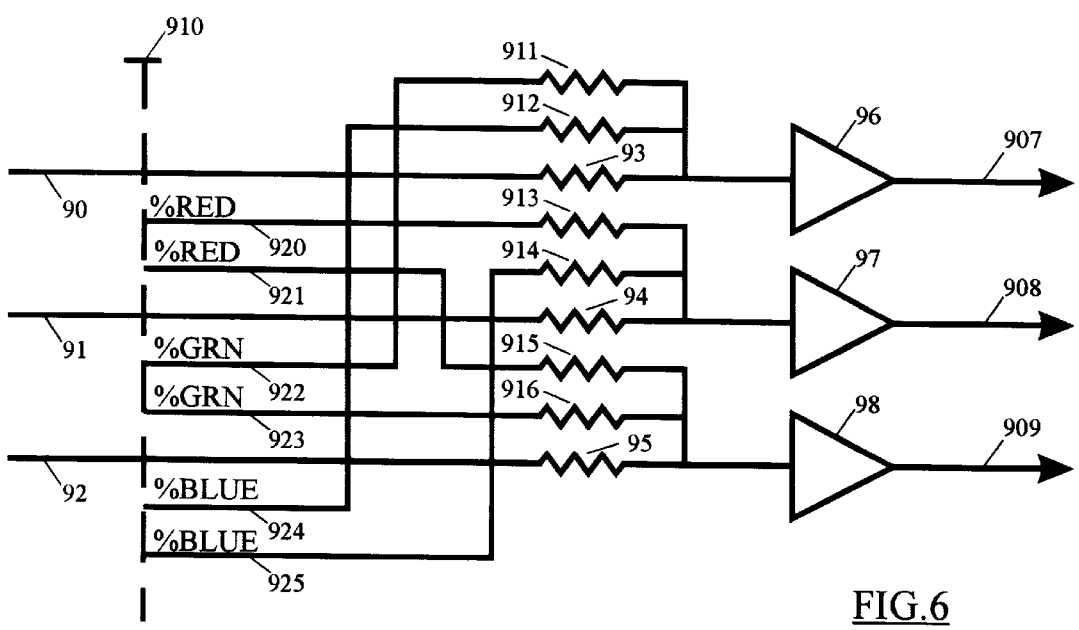
FIG. 6 is a circuit diagram showing another form of the invention allowing for automatic adjustment techniques.

Referring now to FIG. 6, there is shown a circuit diagram of another form of the invention based on the circuit of FIG. 5, but with the cross-mixing variable resistors 901, 902, 903, 904, 905, 906 replaced by fixed resistors 911, 912, 913, 914, 915, 916. The inputs of the fixed resistors 911, 912, 913, 914, 915, 916 are disconnected from the red, green and blue video signals and they are taken to the RCU of the existing system and that specific channel's scan and video electronics at 910. In the configuration of FIG. 6, the percentage of red, green and blue video signals can now be set to match, for example in channel 1, boundaries 42 and 80 of channel 1 to channels 2 and 3 respectively. Also, by horizontal scan timing the two values of channel 1, cross-mixing signals can be smoothed between these two settings as a function of horizontal scan time. The same approach can be taken between, for example, channels 2 and 4 at boundary 81, in which vertical scan timing will control the value.

It is to be appreciated that the embodiments of the invention described above with reference to the accompanying drawings have been given by way of example only and that modifications may be effected. Thus, for example, where mixing is referred to as being done by analog electronic means, it could alternatively be done by digital hardware or by software, for example in the graphics computer.

What is claimed is:

1. Multi-channel visual display apparatus comprising electronic means which is such that adjacent visual displays in a multi-channel display configuration are matched in colour and hue in 2-and 3-primary colour systems by employing cross-mixing of fractions of 2- and 3-primary colour video signals within each individual channel through the use of video summing amplifiers, the cross-mixing taking place according to the formulae:

$$R_{Drive} = R_{IN} + S.G_{IN} + T.B_{IN}$$

$$G_{Drive} = U.R_{IN} + G_{IN} + V.B_{IN}$$

$$B_{Drive} = W.R_{IN} + X.G_{IN} + B_{IN}$$

where S,T,U,V,W and X are selected from the groups consisting of constants and variables, and the channels being matched to each other.

2. Multi-channel visual display apparatus according to claim 1 in which the electronic means utilises additive mixing of red, green and blue video signals to achieve the matching.

3. Multi-channel visual display apparatus according to claim 1 in which the electronic means utilises subtractive mixing of red, green and blue video signals to achieve the matching.

4. Multi-channel visual display apparatus according to claim 1 in which the video summing amplifiers are analogue video summing amplifiers.

5. Multi-channel visual display apparatus according to claim 1 in which the variables are a function of the position within a channel picture.

6. Multi-channel visual display apparatus according to claim 1 in which the variables are a function of horizontal and/or vertical scan timing.

7. Multi-channel visual display apparatus according to claim 1 in which the variables are controlled by a television camera viewing display channels.

8. Multi-channel visual display apparatus according to claim 1 in which the variables are controlled by a 3-primary colour sensor viewing display channels.

9. Multi-channel visual display apparatus according to claim 1 and including at least one of a liquid crystal display projector, a cathode ray tube projector and a light valve projector.

* * * * *